United States Patent
Uzeda Garcia et al.

(10) Patent No.: US 9,326,293 B2
(45) Date of Patent: Apr. 26, 2016

(54) SELECTION OF A SECONDARY COMPONENT CARRIER BASED ON INTERFERENCE INFORMATION

(75) Inventors: Luis Guilherme Uzeda Garcia, Belo Horizonte (BR); Frank Frederiksen, Klarup (DK); Istvan Zsolt Kovacs, Aalborg (DK); Klaus Ingemann Pedersen, Aalborg (DK)

(73) Assignee: Nokia Solutions and Networks Oy, Espoo (FI)

( * ) Notice: Subject to any disclaimer, the term of this patent is extended or adjusted under 35 U.S.C. 154(b) by 101 days.

(21) Appl. No.: 14/008,619

(22) PCT Filed: Mar. 29, 2011

(86) PCT No.: PCT/EP2011/054764
§ 371 (c)(1),
(2), (4) Date: Jul. 29, 2014

(87) PCT Pub. No.: WO2012/130279
PCT Pub. Date: Oct. 4, 2012

(65) Prior Publication Data
US 2014/0335878 A1    Nov. 13, 2014

(51) Int. Cl.
*H04W 72/12* (2009.01)
*H04W 72/14* (2009.01)
*H04W 72/08* (2009.01)
*H04L 5/00* (2006.01)

(52) U.S. Cl.
CPC ............ *H04W 72/085* (2013.01); *H04L 5/001* (2013.01); *H04L 5/0062* (2013.01); *H04L 5/0066* (2013.01); *H04L 5/0033* (2013.01)

(58) Field of Classification Search
CPC . H04W 72/082; H04W 24/02; H04W 52/244; H04W 16/14; H04W 24/08; H04W 24/10; H04W 52/34; H04W 52/143; H04W 72/0453; H04W 72/085; H04W 72/085; H04W 16/10; H04W 28/048; H04W 84/045; H04W 84/12; H04W 88/06; H04W 16/12; H04W 28/04; H04W 28/18; H04W 52/42; H04W 72/02; H04W 72/12; H04W 16/16; H04W 24/06
USPC .............. 455/452.1, 434, 436, 450, 266, 411, 455/422.1, 424, 425, 438, 446, 452.2, 454, 455/501, 509, 561; 370/329, 252, 328, 253
See application file for complete search history.

(56) References Cited

U.S. PATENT DOCUMENTS

| 2004/0082337 A1* | 4/2004 | Lacroix ................. H04L 1/1607 455/450 |
| 2010/0296389 A1 | 11/2010 | Khandekar et al. ........... 370/216 |

(Continued)

FOREIGN PATENT DOCUMENTS

| CN | 101223716 A | 7/2008 |
| WO | WO 2006/086359 A2 | 8/2006 |

OTHER PUBLICATIONS

Garcia L G U et al: "Autonomous component carrier selection: interference management in local area environments for LTE-advanced", IEEE Communications Magazine, vol. 47, No. 9, Sep. 2089 (2809-09),pp. 118-116, XP811283372, IEEE Service Center, Piscataway, US ISSN: 8163-6884, DOI: IO. IIO9/MCOM.2089.5277463.*

(Continued)

*Primary Examiner* — Inder Mehra
(74) *Attorney, Agent, or Firm* — Harrington & Smith (57) ABSTRACT

A method includes selecting a candidate component carrier for a cell and determining if said candidate component carrier is to be used in said cell in dependence on information indicating activity in at least one of said cell and another cell using said candidate component carrier.

34 Claims, 5 Drawing Sheets

(56) References Cited

U.S. PATENT DOCUMENTS

2011/0128870 A1* 6/2011 Madan .................... H04L 47/14
370/252
2013/0188537 A1* 7/2013 Marque-Pucheu H04W 72/0453
370/281

OTHER PUBLICATIONS

3GPP TS 36.314 V9.1.0 (Jun. 2010), "3$^{rd}$ Generation Partnership Project; Technical specification Group Radio Access Network; Evolved Universal Terrestrial Radio Access (E-UTRA); Layer 2—Measurements (Release 9)", 17 pgs.

Garcia, Luis G., et al., "Autonomous Component Carrier Selection for Local Area Uncoordinated Deployment of LTE-Advanced", © 2009 IEEE, 5 pgs.

Iwamura, Mikio, et al., "Carrier Aggregation Framework in 3GPP LTE-Advanced", © 2010 IEEE, 8 pgs.

Garcia, Luis, G., et al., :Autonomous Component Carrier Selection: Interference Management in Local Area Environments for LTE-Advanced, © 2009 IEEE, 7 pgs.

* cited by examiner

SELECTION OF A SECONDARY COMPONENT CARRIER BASED ON INTERFERENCE INFORMATION

The invention relates a method and apparatus and in particular but not exclusively to a method and apparatus and in particular but not exclusively to the selection of a component carrier.

A communication system can be seen as a facility that enables communication sessions between two or more entities such as fixed or mobile communication devices, base stations, servers and/or other communication nodes. A communication system and compatible communicating entities typically operate in accordance with a given standard or specification which sets out what the various entities associated with the system are permitted to do and how that should be achieved. For example, the standards, specifications and related protocols can define the manner how communication devices can access the communication system and how various aspects of communication shall be implemented between communicating devices. A communication can be carried on wired or wireless carriers. In a wireless communication system at least a part of the communication between at least two stations occurs over a wireless link.

Examples of wireless systems include public land mobile networks (PLMN) such as cellular networks, satellite based communication systems and different wireless local networks, for example wireless local area networks (WLAN). A wireless system can be divided into cells, and hence these are often referred to as cellular systems. A cell is provided by a base station. Cells can have different shapes and sizes. A cell can also be divided into sectors. Regardless of the shape and size of the cell providing access for a user equipment, and whether the access is provided via a sector of a cell or a cell, such area can be called radio service area or access area. Neighbouring radio service areas typically overlap, and thus a communication in an area can listen to more than one base station.

A user can access the communication system by means of an appropriate communication device. A communication device of a user is often referred to as user equipment (UE) or terminal. A communication device is provided with an appropriate signal receiving and transmitting arrangement for enabling communications with other parties. Typically a communication device is used for enabling receiving and transmission of communications such as speech and data. In wireless systems a communication device provides a transceiver station that can communicate with another communication device such as e.g. a base station of an access network and/or another user equipment. The communication device may access a carrier provided by a station, for example a base station, and transmit and/or receive communications on the carrier.

An example of communication systems attempting to satisfy the increased demands for capacity is an architecture that is being standardized by the 3rd Generation Partnership Project (3GPP). This system is often referred to as the long-term evolution (LTE) of the Universal Mobile Telecommunications System (UMTS) radio-access technology. The LTE aims to achieve various improvements, for example reduced latency, higher user data rates, improved system capacity and coverage, reduced cost for the operator and so on. A further development of the LTE is often referred to as LTE-Advanced. The various development stages of the 3GPP LTE specifications are referred to as releases.

In LTE-Advanced the network nodes can be wide area network nodes such as a macro eNodeB B (eNB) which may, for example, provide coverage for an entire cell. Alternatively in LTE-Advanced, network nodes can be small area network nodes such as Home eNBs (HeNB) (femto cells) or pico eNodeBs (pico-eNB). HeNBs may be configured to support local offload and may support any UE or UEs belonging to a closed subscriber group (CSG) or an open subscriber group (OSG). Pico eNBs can, for example, be configured to extend the range of a cell. In some instances a combination of wide area network nodes and small area network nodes can be deployed using the same frequency carriers (e.g. co-channel deployment).

LTE-A provides for carrier aggregation, by which two or more component carriers are aggregated in order to support transmission bandwidths wider than that defined by a single component carrier.

According to one embodiment, there is provided a method comprising: selecting a candidate component carrier for a cell; and determining if said candidate component carrier is to be used in said cell in dependence on information indicating activity in at least one of said cell and another cell using said candidate component carrier.

The method may comprise determining if said candidate component carrier is to be used in said cell in dependence on information on interference coupling between said cell and said another cell.

The interference coupling information may comprise at least one of incoming carrier to interference information and outgoing carrier to interference information.

The interference coupling information may comprise background interference matrix information.

The activity information may comprise expected signal to noise ratio at said another cell when said candidate cell does not uses said candidate component carrier.

The activity information may comprise predefined signal to noise ratio information of a free component carrier.

The interference coupling information may comprise measured value information for said candidate component carrier.

The information indicating activity may comprise information indicating usage of at least one of frequency and time resources by said cell.

The information indicating expected activity may be is in respect of said candidate component carrier.

The information indicating expected activity may comprise average usage information for a plurality of component carriers.

The information indicating expected activity may comprise physical resource block usage information.

The activity information may comprise the probability of said cell transmitting on said candidate component carrier given that said another cell transmits at the same time on said candidate component carrier.

The determining may comprise determining at least one of incoming and outgoing interference to said another cell.

The determining may comprise comparing said interference to a threshold.

The threshold may be dependent on if said candidate component carrier is a base component carrier or a secondary component carrier in said another cell.

The method may comprise defining a level of activity for said candidate component carrier in said cell such that a requirement associated with said threshold is met.

In another embodiment, a computer program is provided which comprises executable code configured to perform any of the steps above, when the computer program is run on a processor.

According to another embodiment, there is provided an apparatus comprising at least one processor and at least one memory including computer program code, the at least one memory and computer program code configured, with the at least one processor, to cause the apparatus to: select a candidate component carrier for a cell; and determine if said candidate component carrier is to be used in said cell in dependence on information indicating activity in at least one of said cell and another cell using said candidate component carrier.

The at least one memory and computer program code may be configured, with the at least one processor, to cause the apparatus to determine if said candidate component carrier is to be used in said cell in dependence on information on interference coupling between said cell and said another cell.

The interference coupling information may comprise at least one of incoming carrier to interference information and outgoing carrier to interference information.

The interference coupling information may comprise background interference matrix information.

The activity information may comprise expected signal to noise ratio at said another cell when said candidate cell does not uses said candidate component carrier.

The activity information may comprise predefined signal to noise ratio information of a free component carrier.

The interference coupling information may comprise measured value information for said candidate component carrier.

The activity information activity may comprise information indicating usage of at least one of frequency and time resources by said cell.

The information indicating expected activity may be in respect of said candidate component carrier.

The information indicating expected activity may comprise average usage information for a plurality of component carriers The information indicating expected activity may comprise physical resource block usage information.

The activity information may comprises the probability of said cell transmitting on said candidate component carrier given that said another cell transmits at the same time on said candidate component carrier.

The at least one memory and computer program code may be configured to with the at least one processor cause the apparatus to determine at least one of incoming and outgoing interference to said another cell.

The at least one memory and computer program code may be configured to with the at least one processor cause the apparatus to compare said interference to a threshold.

The threshold may dependent on if said candidate component carrier is a base component carrier or a secondary component carrier in said another cell.

The at least one memory and computer program code may be configured to with the at least one processor cause the apparatus to define a level of activity for said candidate component carrier in said cell such that a requirement associated with said threshold is met.

According to another aspect, there may be provided apparatus comprising: selecting means for selecting a candidate component carrier for a cell; and determining means for determining if said candidate component carrier is to be used in said cell in dependence on information indicating activity in at least one of said cell and another cell using said candidate component carrier.

According to another aspect there is provided a base station comprising apparatus as described above.

Embodiments will now be described in further detail, by way of example only, with reference to the following examples and accompanying drawings, in which.

In the following certain exemplifying embodiments are explained with reference to a wireless or mobile communication system serving communication devices. Before explaining in detail the exemplifying embodiments, certain general principles of a wireless communication system, access systems thereof, and communication devices are briefly explained with reference to FIGS. 1 to 3 to assist in understanding the technology underlying the described examples.

Figure 1:
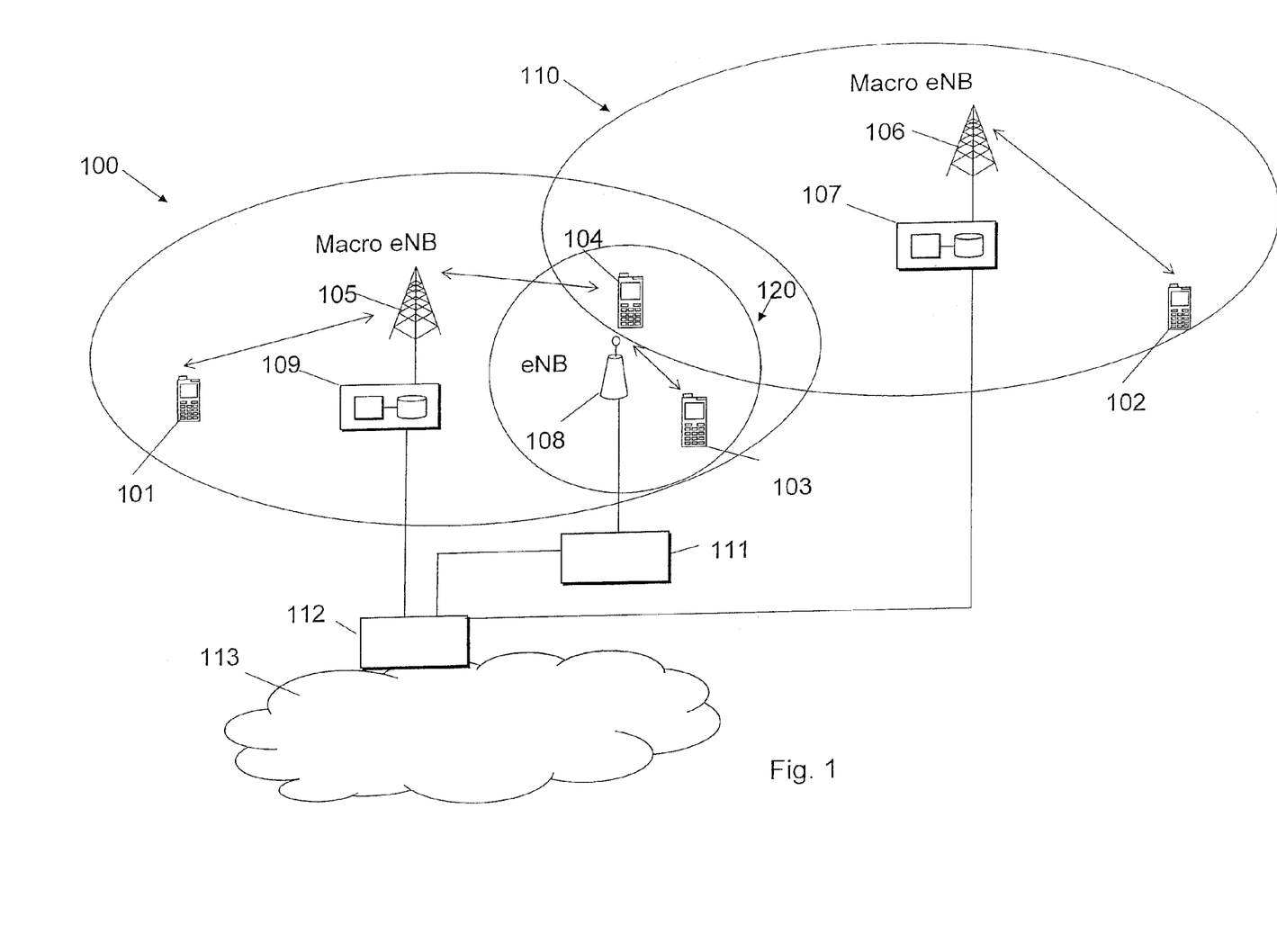
FIG. 1 shows a schematic diagram of a network according to some embodiments.

A communication device or user equipment 101, 102, 103, 104 is typically provided wireless access via at least one base station or similar wireless transmitter and/or receiver node of an access system. In FIG. 1 three neighbouring and overlapping access systems or radio service areas 100, 110 and 120 are shown being provided by base stations 105, 106, and 108.

However, it is noted that instead of three access systems, any number of access systems can be provided in a communication system. An access system can be provided by a cell of a cellular system or another system enabling a communication device to access a communication system. A base station site 105, 106, 108 can provide one or more cells. A base station can also provide a plurality of sectors, for example three radio sectors, each sector providing a cell or a subarea of a cell. All sectors within a cell can be served by the same base station. A radio link within a sector can be identified by a single logical identification belonging to that sector. Thus a base station can provide one or more radio service areas. Each communication device 101, 102, 103, 104, and base station 105, 106, and 108 may have one or more radio channels open at the same time and may send signals to and/or receive signals from more than one source.

Base stations 105, 106, 108 are typically controlled by at least one appropriate controller apparatus 109, 107 so as to enable operation thereof and management of communication devices 101, 102, 103, 104 in communication with the base stations 105, 106, 108. The control apparatus 107, 109 can be interconnected with other control entities. The control apparatus 109 can typically provided with memory capacity 301 and at least one data processor 302. The control apparatus 109 and functions may be distributed between a plurality of control units. Although not shown in FIG. 1 in some embodiments, each base station 105, 106 and 108 can comprise a control apparatus 109, 107.

The cell borders or edges are schematically shown for illustration purposes only in FIG. 1. It shall be understood that the sizes and shapes of the cells or other radio service areas may vary considerably from the similarly sized omnidirectional shapes of FIG. 1.

In particular, FIG. 1 depicts two wide area base stations 105, 106, which can be macro-eNBs 105, 106. The macro-eNBs 105, 106 transmit and receive data over the entire coverage of the cells 100 and 110 respectively. FIG. 1 also shows a smaller area base station or access point which in some embodiments can be a pico, a femto or Home eNB 108. The coverage of the smaller area base station 108 is generally smaller than the coverage of the wide area base stations 105, 106. The coverage provided by the smaller area node 108 overlap with the coverage provided by the macro-eNBs 105, 106. Pico eNBs can be used to extend coverage of the macro-eNBs 105, 106 outside the original cell coverage 100, 110 of the macro-eNBs 105, 106. The pico eNB can also be used to provide cell coverage in "gaps" or "shadows" where there is no coverage within the existing cells 100, 110 and/or may serve "hot spots". In some embodiments, the smaller area node can be a femto or Home eNB which can provide coverage for a relatively small area such as the home. Some environments may have both pico and femto cells.

As shown, the radio service areas can overlap. Thus signals transmitted in an area can interfere with communications in another area (macro to macro, pico/femto to either one or both of the macro cells, and/or pico/femto to pico/femto).

The communication devices 101, 102, 103, 104 can access the communication system based on various access techniques, such as code division multiple access (CDMA), or wideband CDMA (WCDMA). Other examples include time division multiple access (TDMA), frequency division multiple access (FDMA) and various schemes thereof such as the interleaved frequency division multiple access (IFDMA), single carrier frequency division multiple access (SC-FDMA) and orthogonal frequency division multiple access (OFDMA), space division multiple access (SDMA) and so on.

Some non-limiting examples of the recent developments in communication systems are the long-term evolution (LTE) of the Universal Mobile Telecommunications System (UMTS) that is being standardized by the 3rd Generation Partnership Project (3GPP). As explained above, further development of the LTE is referred to as LTE-Advanced. Non-limiting examples of appropriate access nodes are a base station of a cellular system, for example what is known as NodeB (NB) in the vocabulary of the 3GPP specifications. The LTE employs a mobile architecture known as the Evolved Universal Terrestrial Radio Access Network (E-UTRAN). Base stations of such systems are known as evolved Node Bs (eNBs) and may provide E-UTRAN features such as user plane Radio Link Control/Medium Access Control/Physical layer protocol (RLC/MAC/PHY) and control plane Radio Resource Control (RRC) protocol terminations towards the user devices. Other examples of radio access systems include those provided by base stations of systems that are based on technologies such as wireless local area network (WLAN) and/or WiMax (Worldwide Interoperability for Microwave Access).

In FIG. 1 the base stations 105, 106, 108 of the access systems can be connected to a wider communications network 113. A controller apparatus 107, 109 may be provided for coordinating the operation of the access systems. A gateway function 112 may also be provided to connect to another network via the network 113. The smaller area base station 108 can also be connected to the other network by a separate gateway function 111. The base stations 105, 106, 108 can be connected to each other by a communication link for sending and receiving data. The communication link can be any suitable means for sending and receiving data between the base stations 105, 106 and 108 and in some embodiments the communication link is an X2 link.

The other network may be any appropriate network. A wider communication system may thus be provided by one or more interconnect networks and the elements thereof, and one or more gateways may be provided for interconnecting various networks.

Figure 2:
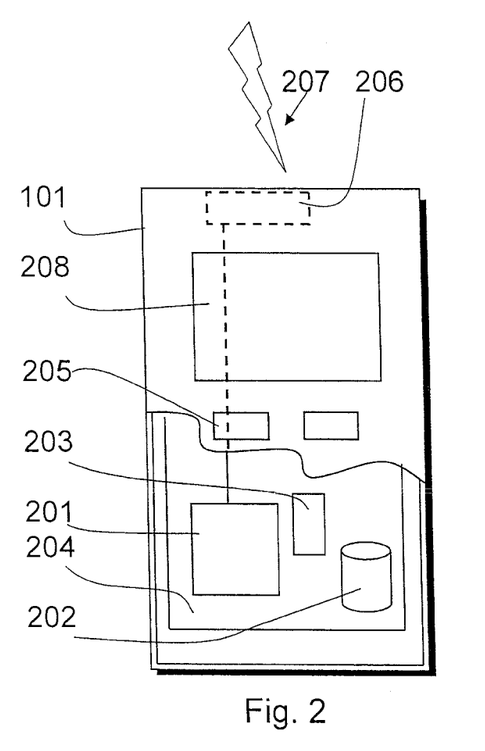
FIG. 2 shows a schematic diagram of a communication device according to some embodiments.

The communication devices will now be described in more detail in reference to FIG. 2. FIG. 2 shows a schematic, partially sectioned view of a communication device 101 that a user can use for communication. Of course the other communication devices shown in FIG. 1 may have the same or similar features. Such a communication device is often referred to as user equipment (UE) or terminal. An appropriate communication device may be provided by any device capable of sending and receiving radio signals. The communication device may be mobile or may be generally stationary. Non-limiting examples include a mobile station (MS) such as a mobile phone or what is known as a 'smart phone', a portable computer provided with a wireless interface card or other wireless interface facility, personal data assistant (PDA) provided with wireless communication capabilities, a computer or any combinations of these or the like.

A communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. User may also be provided broadcast or multicast data. Non-limiting examples of the content include downloads, television and radio programs, videos, advertisements, various alerts and other information.

The device 101 may receive signals over an air interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the communication device.

The communication device is also typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204.

The user may control the operation of the communication device by means of a suitable user interface such as key pad 205, voice commands, touch sensitive screen or pad, combinations thereof or the like. A display 208, a speaker and a microphone can be also provided. Furthermore, a communication device may comprise appropriate connectors (either wired or wireless) to other devices and/or for connecting external accessories, for example hands-free equipment, thereto.

Figure 3:
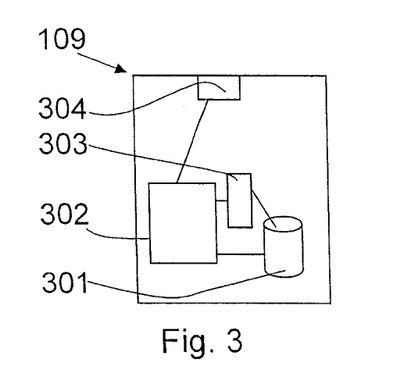
FIG. 3 shows a schematic diagram of a control apparatus according to some embodiments.

FIG. 3 shows an example of a control apparatus 109 for a communication system, for example to be coupled to and/or for controlling a station of an access system. In some embodiments the base stations 105, 106, and 108 comprise a control apparatus 109. In some embodiments, each base station will have a control apparatus. In other embodiments the control apparatus can be another network element. The control apparatus 109 can be arranged to provide control of communications by communication devices that are in the service area of the system. The control apparatus 109 can be configured to provide control functions in association with generation and communication of transmission patterns and other related information by means of the data processing facility in accordance with certain embodiments described below. For this purpose the control apparatus 109 comprises at least one memory 301, at least one data processing unit 302, 303 and an input/output interface 304. Via the interface the control apparatus can be coupled to a receiver and a transmitter of the base station. The control apparatus 109 can be configured to execute an appropriate software code to provide the control functions.

As mentioned previously, LTE-A is being proposed in the 3GPP context. Such a system has carrier aggregation (CA) and supports heterogeneous networks (HetNet). A heterogeneous network has a conventional cellular network which may be overlaid with one or more micro, pico and/or femto cells. The femto cells may be home femto cells which may be subject to unplanned deployment. Efficient interference management schemes are therefore desirable for the optimisation of HetNet cases. One of the proposed interference management schemes for LTE-A uses carrier aggregation and is called autonomous component carrier selection (ACCS).

The ACCS scheme provides an automatic and distributed mechanism for dynamic frequency reuse of component carriers (CC). In the ACCS concept, there is the initial selection of a cell specific component carrier. This initial selection of the cell's specific component carrier is the main component carrier to be used by the base station which has full cell coverage regardless of the served user equipment's capability. This main component carrier has been previously referred to as the primary component carrier. In this document, this main component carrier is referred to as the base component carrier (BCC). This base component carrier is the component carrier which is the one which is always available to the base station. Any additional (that is additional to the BCC) component carriers available for the base station and user equipment to access will be called the supplementary component carriers (SCC). These SCCs are cell specific. In some situations, these supplementary component carriers are sometimes referred to as secondary component carriers.

The ACCS concept also relies on the collection of a background interference matrix (BIM) at each base station. The BIM is used by the base stations to determine if that base station is allowed to take additional component carriers into use without experiencing or causing excessively low signal to interference plus noise ratio (SINR) in the evaluating base station as well as any surrounding cells using the same component carrier.

This autonomous component carrier selection scheme provides an automatic and fully distributed mechanism for dynamic frequency re-use on a sub-band (component carrier) resolution for LTE-Advanced. Currently ACCS relies on Background Interference Matrices (BIMs) that successfully capture the spatial sparseness (different deployment ratios) of the network, but fail to capture the temporal sparseness stemming from traffic variability over time.

The inventors have appreciated that ACCS as well as hard and static frequency domain schemes may become less effective when traffic load decreases. The inventors have also appreciated that ACCS is still effective under moderate/high traffic loads as it approaches a full-buffer (infinite backlog) scenario.

Therefore, in its currently proposed form, ACCS and its SINR (signal to interference noise ratio) constraints tend to act as an overprotective limitation. The potential interference coupling captured by the BIM may only be realized when the resources are being used simultaneously. Time-variant traffic may lead to underutilized CCs, rendering the interference coupling estimations overly pessimistic. As ACCS is originally designed with full load in mind (that is a worst case situation), the inventors have appreciated that embodiments may adapt to traffic variation over time. This may in some embodiments enhance the ACCS in order to provide a solution to the peak-average-outage throughput trade-off under different network topology and traffic conditions.

In practical deployment scenarios generally not all HeNBs need additional CCs at all times. This can be due to long-term traffic demand patterns, e.g. time of the day dependent traffic. Additionally, deployed CCs might not be fully loaded at all times due to scheduling decisions and random session arrival intervals. The ACCS concept tracks long term traffic demand patterns (CC utilization) but is oblivious to the actual intra-CC usage of time and frequency resources (PRBs (physical resource blocks) in LTE).

High resolution Inter-Cell Interference Coordination (ICIC) schemes that operate on a PRB level—which therefore try to track the actual instantaneous/short-term averaged cell load and resource utilization—may be complex. There may be complexity with such PRB level schemes due to the joint treatment at the scheduler level of both incoming and outgoing interference. While desirable from a theoretical perspective, such combined approaches may lead to excessive signalling or unrealistic scheduling policies due to the fast-changing nature of traffic and fading processes in multiple cells.

Finally, another issue with the ACCS concept is the equal emphasis put on incoming and outgoing interference estimations during the decision process. The inventors have recognised that generally from a cell-centric perspective more bandwidth is usually not harmful, even with a low expected SINR.

Some embodiments use the ACCS concept which is extended to deal with time-domain related aspects of component carrier selection, such as bursty data. Some embodiments provide ACCS with an awareness of the traffic intensity. Some embodiments may map the spatial-domain-aware interference coupling information into a spatial-temporal-domain-aware one, which is used in the decision process.

Figure 4:
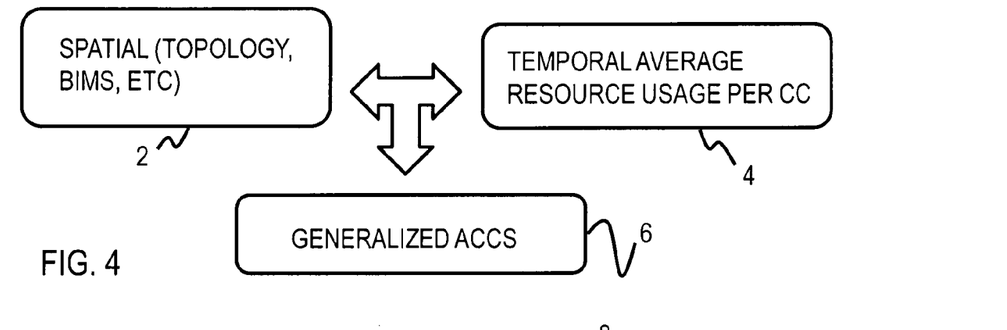
FIG. 4 shows schematically a conceptual description of an embodiment.

Reference is made to FIG. 4 which shows a conceptual description of an embodiment. Some embodiments build on ACCS and may be referred to a generalised ACCS—G-ACCS. It should be appreciated that embodiments may be applied in scenarios where ACCS is not used.

G-ACCS 6 uses the spatial information available for the topology of the network, BIM table information and/or any other suitable information. This is referenced 2. G-ACCS also uses temporal information such as temporal average resource usage per CC. This is referenced 4.

G-ACCS retains the first-come, first served service policy of ACCS but allows cells selecting their CCs later on (posterior cells) to try and allocate new CCs provided that those cells account for and/or control their expected PRB usage in order to minimize or reduce the outgoing interference towards the cell currently holding that CC (prior cell). Some embodiments try and maximize the capacity of both posterior and prior cells using the assumption that prior cells have higher priority and their respective SINRs estimated according to the framework described in more detail below shall not drop below a pre-defined threshold.

Figure 5:
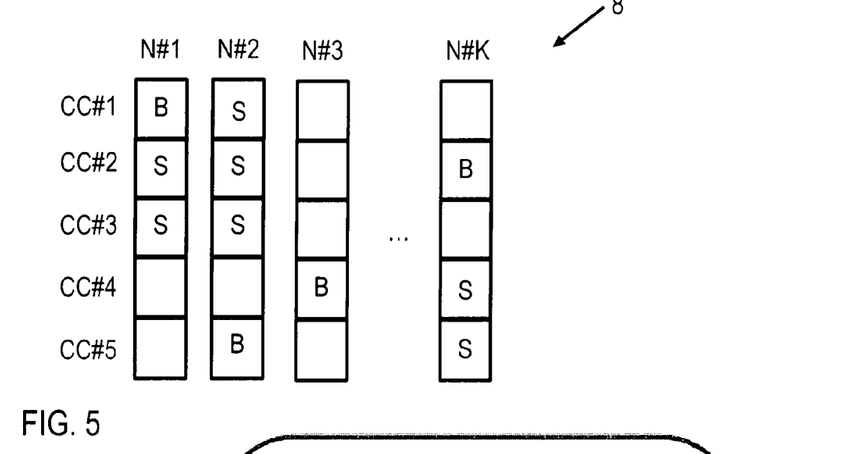
FIG. 5 shows an example of a component carrier radio allocation table.

The original ACCS concept does not deal with traffic requirements and fairness governing either the acquisition or the release of SCCs. Such requests are expected to come from lower radio resource management (RRM) layers. In embodiments, as in ACCS the CC allocation of neighbouring cells is stored locally by each eNB in a component carrier radio allocation table (CCRAT). An example of such a table 8 is shown in FIG. 5. The CCRAT table may be stored in a dedicated or shared memory in for example the controller of FIG. 3.

In the table shown, five component carriers CC#1 ... CC#5 are listed in the rows. In the column K neighbouring cells N#1 ... K are listed. For each neighbouring cell, the base component carrier is indicated with a B and any supplementary component carriers are indicated with S. For example, for neighbouring cell N#1, the base component carrier is CC#1 and the second component carriers are CC#2 and CC#3. It should be appreciated that there may be more or less than five component carriers listed in the table and there may be any number of neighbouring cells. K may therefore be 1 or more.

In embodiments, each HeNB broadcasts its own radio resource allocation table (RRAT) over a specified low capacity signalling channel (wired or wireless), i.e. the selection of the CCs, respective power reductions and their use type: base or supplementary. This information can be used by neighbouring cells to populate their CCRAT. Other embodiments may use different methods to obtain their CCRAT. Generally the CCRAT will include information on the closest (in terms of estimated received wideband signal strength) HeNBs.

In some embodiments once a cell requires additional CCs, that cell will take them into use without any further consideration if and only if the desired CC(s) is not used by any of its neighbouring cells. Therefore, some embodiments may retain the first-come, first served service policy of ACCS.

In this case, this cell is denoted a prior cell for this/these CC(s). Whenever a cell attempts the allocation of a CC that is already taken by some prior cell, the allocating cell takes on the role of a posterior cell. This means the allocating cell shall take into account its expected resource utilization when deciding whether or not the allocating cell is allowed to deploy the desired CC. This may take into account the potential damage (mapped SINR) caused to the prior cell. In some embodiments, the allocating cell may proactively set its expected activity depending on for example the potential damage to the prior cell.

Figure 6:
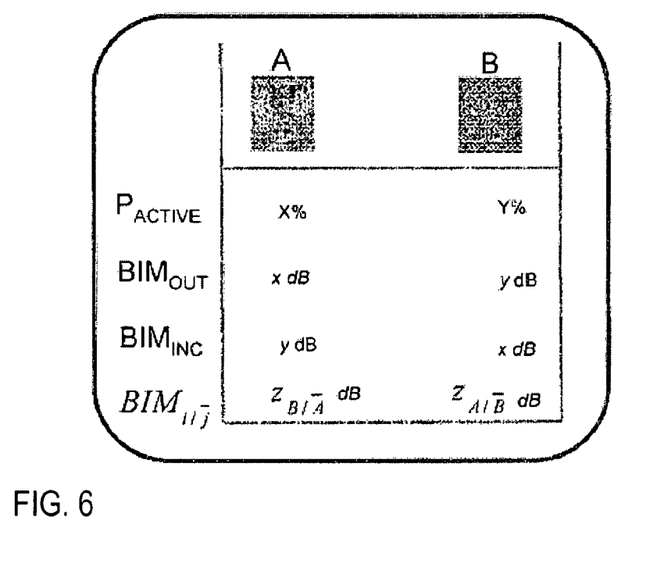
FIG. 6 shows information used for interference coupling evaluation in an embodiment.

The SINR mapping is performed as explained with reference to FIG. 6 using a non-limiting example consisting of 2 cells A and B. FIG. 6 shows information employed during the interference coupling evaluation. In one embodiment, all the information contained in FIG. 6 would be available to the evaluating cell. However some pieces of information may be less critical. A could for example assume that Y %=100% in one embodiment. In the described embodiment, A is the evaluating cell (allocating cell).

$P_{active}$ is the PRB usage measurement which indicates the utilization of time and frequency resources by each cell as a percentage value. In alternative embodiments, $P_{active}$ may be defined in different terms, rather than as a percentage value. There may be one value per CC since there might be differences among CC due to scheduling decisions and the random session arrival intervals in different cells. This metric is for example available and standardized by 3GPP in TS 36.314, Section 4.1.1. If cell wanted to use a new CC, than an X value for that new CC can be estimated by the packet scheduler given the traffic that triggered the need for additional CCs. Alternatively, this information can be set proactively by cell A such that it is allowed to use the CC. This means that X was set, such that x' (explained in more detail later) becomes higher than the target. In which case, the cell would not go over the utilization ratio (X) that finally allowed the CC to be deployed.

An alternative approach for estimating $P_{active}$ is to apply sensing in the frequency domain. One simplified approach of an alternative embodiment maybe to measure the average PRB utilization and use this as an estimate for all identified interfering cells. Such an approach may be utilized to support the inter-cell exchange of information.

The two entries $BIM_{inc}$ and $BIM_{out}$ are used in original ACCS concept. $BIM_{inc}$ is the BIM table for incoming interference coupling and $BIM_{out}$ is the table for outgoing interference coupling. x and y dB represent the entries in the original BIM (raw values), i.e. incoming and outgoing C/I (carrier to interference) values assuming that the resources are fully utilized in both cells simultaneously and with the same power spectral density (PSD).

$BIM_{i|j}$ indicates the expected SINR experienced at cell i when cell j does not use/share the desired CC. Two alternatives set out below for defining $BIM_{i|j}$:

In one embodiment, $BIM_{i|j}$ may correspond to the predefined SINR of a free CC. One advantage of is that this parameter may be already known, thus requiring no additional signalling.

In some embodiments, this parameter may be less accurate as a network becomes denser.

In another embodiment $BIM_{i|j}$ may be obtained from measured values (per CC) that are exchanged between a pair of nodes. One advantage higher accuracy and the inclusion of near-real time SINR information may be obtained which may facilitate a closed loop control of the impact of any allocation. This may require some additional signalling.

It should be appreciated that some embodiments may use a combination of these methods. In other embodiments, other methods of obtaining $BIM_{i|j}$ or a similar measure may be used.

Figure 7:
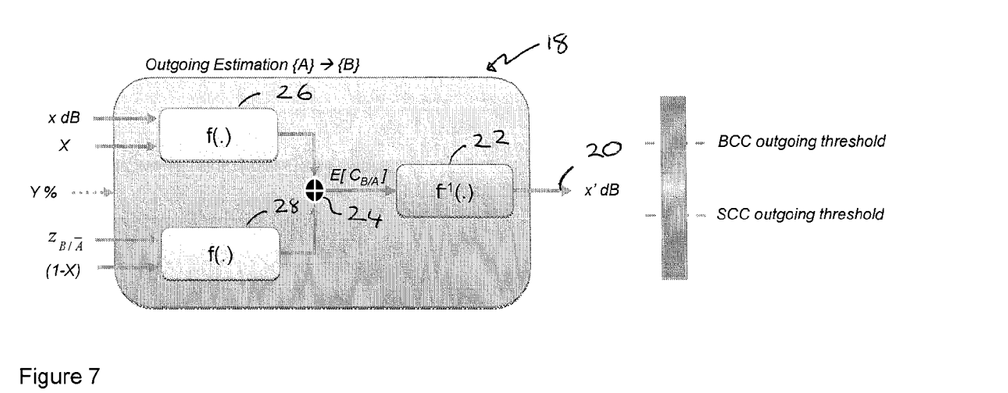
FIG. 7 shows schematically outgoing interference estimation in an embodiment.
Figure 8:
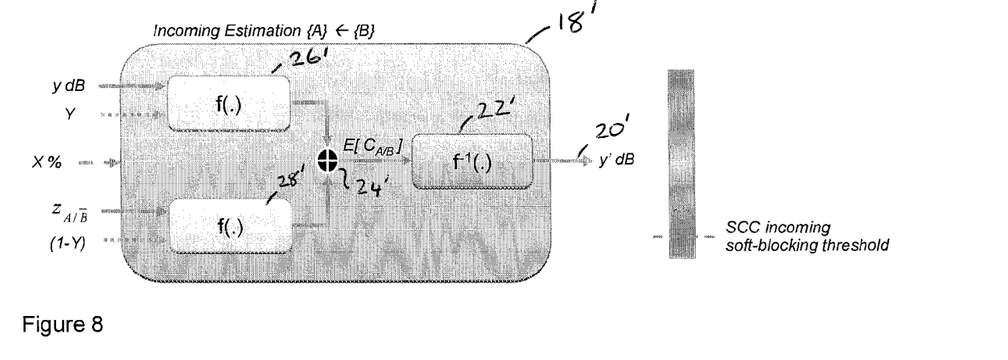
FIG. 8 shows schematically incoming interference estimation in an embodiment.

Reference is now made to FIGS. 7 and 8 which show schematically the outgoing interference estimation x'dB and incoming interference estimation y' dB respectively.

x' and y' are processed values and the outputs of the proposed mapping. While x and y only capture the spatial-domainaware interference coupling; x' and y' are the spatialtemporal-domain-aware C/I estimations.

Reference is first made to FIG. 7 which shows a general framework for the outgoing interference estimation. Dashed arrows depict optional inputs of one embodiment. Spatial information is combined with the expected activity to yield a SINR estimate that accounts for the average resource occupancy due to traffic variability.

In this example, it is assumed that cell A wished to deploy a CC that is currently being used by cell B and that their traffic conditions and scheduler decisions are independent of one another. In some embodiments the impact, of the new CC allocation (additionally to cell A) to the existing allocation (to cell B) given that the resource utilization is not necessarily 100%, is determined.

The calculations performed by the block 18 of FIG. 7 are based on P(A|B)—the probability P of A transmitting given that B transmits at the same time—instead of P(A∩B)—actual probability of a simultaneous transmission—because the latter may be misleading. The following values are assumed in one example:

Cell A is evaluating whether or not to use CC #c that is currently being used by B.

$$P(A)=X=0.9 \text{ and } P(B)=Y=0.1$$

The probability of an actual collision P(A∩B)=0.09.

However P(A|B) (the probability of A transmitting given that B is transmitting) due to the assumption of independent transmissions at A and B, equals P(A)=0.9.

In other words, B's existing infrequent transmissions will be disrupted in 90% of the time by the transmission of A.

The mapping function f(.) and its inverse f$^{-1}$ is a Shannon-like formula adjusted to reflect the link level performance (capacity) of a system e.g. LTE as a function of SINR.

The following calculations are performed by block 18:

$$E[C/I_{A \to B}] = x' = f^{-1}(P(A|B) \cdot f(x) + (1 - P(A|B)) \cdot f(z_{B|\overline{A}}))$$

$$E[C/I_{A \to B}] = x' = f^{-1}(X \cdot f(x) + (1 - X) \cdot f(z_{B|\overline{A}}))$$

In particular (0<x<=1) and x (after conversion to a linear value) are input to a first block 26 which performs a first function X.f(x). This can alternatively be expressed (P(A|B).f(x). X and x are obtained for example from the table of FIG. 6.

$z_{B|\overline{A}}$ and 1−X are input to a second block 28 which performs a function $(1-X) \cdot f(z_{B|A})$. 1−X can alternatively be expressed as 1−P(A|B).

The outputs of the first and second blocks 26 and 28 are summed by a summer 24 to provide an output E[$C_{B/A}$] which is input to a third block 22 The output of the summer represents the expected capacity (throughput or spectral efficiency, if normalized by the bandwidth of the CC) of cell B given the interference created by cell A in case it deploys the CC with a utilization ratio given by X.

The third block 22 then performs the inverse function of f(.) to map the spectral efficiency into a C/I ratio.

In some embodiments, cell A can evaluate its outgoing interference entirely based on X, which is locally calculated without knowledge of Y, thus saving some signalling load. In some embodiments Y, may be used, for example in the case of specialized schedulers.

Reference is now made to FIG. 8 which shows the calculation of y' during the incoming C/I estimation. The block 18' is configured to perform the same function as the corresponding block of FIG. 7. In particular, block 18' has a first block 26', a second block 28', a summer 24' and a third block 22'. The functions of these blocks are generally the same as the corresponding blocks of FIG. 7. However the input data is different. The first block 26' receives y and Y as an input. The second block 28' receives 1−Y and $z_{A|\overline{B}}$ Thus the calculation of y' is analogous to the calculation of x' but does require the knowledge of P(B)=Y, since it is assumed that P(B|A)=P(B). Nonetheless, in a simplified implementation, due to incomplete information, cell B can be assumed to be always active on CC # c. In other words: P(B|A)=P(B)=1 ↔ Y'=Y. This provides a lower bound to the expected SINR and if cell B is inactive, this would anyway be indicated by cell B not having deployed CC # c.

Thus FIG. 8 shows the general framework for the incoming interference estimation. Dashed arrows depict optional inputs. Spatial information is combined with the expected activity to yield a SINR estimate that accounts for the average resource occupancy due to traffic variability.

It should be appreciated that the blocks of FIGS. 7 and/or 8 may be provided in an eNB and in particular may be implemented by the combination of at least one processor and at least one memory, such as discussed in relation to FIG. 3. A separate block may be provided to perform the functions of FIGS. 7 and/or 8 or the functions may be provided by at least one processor and at least one memory which are provided to provide other functions.

Finally, the decision/evaluation has a further step in which x' and y' compared to respective thresholds.

x' is compared either to a BCC or SCC outgoing SINR threshold depending on whether the CC in question is a BCC or a SCC in the prior cell. The SCC threshold is less than the BCC threshold in some embodiments. The SCC threshold may be the same as the BCC threshold in some embodiments.

y' is compared to a SCC incoming soft-blocking threshold: the extra CC is an SCC of the posterior (candidate) cell The second comparison against the incoming soft-blocking threshold may be provided in some embodiments to address the issue that from a cell-centric perspective more bandwidth is almost always beneficial. However, there may be an exception to that case where the estimated SINR is so low, that not even synchronization can be ascertained, e.g. −7 dB.

If y' is greater than threshold and x' is greater than then relevant threshold, then the candidate CC can be used.

Embodiments may be used in a passive or active fashion. In the former, the activity (or average resource share usage) can be considered to be an uncontrolled variable that depends solely on the offered traffic and is merely used as an input to the estimation of the interference coupling. Alternatively, the cell could actively control its expected usage of the resources/activity to minimize the outgoing interference towards a prior cell, such that an allocation that otherwise would be denied becomes now possible. In other words, the level of usage X is reduced or limited such that x' is above the respective threshold.

Figure 9:
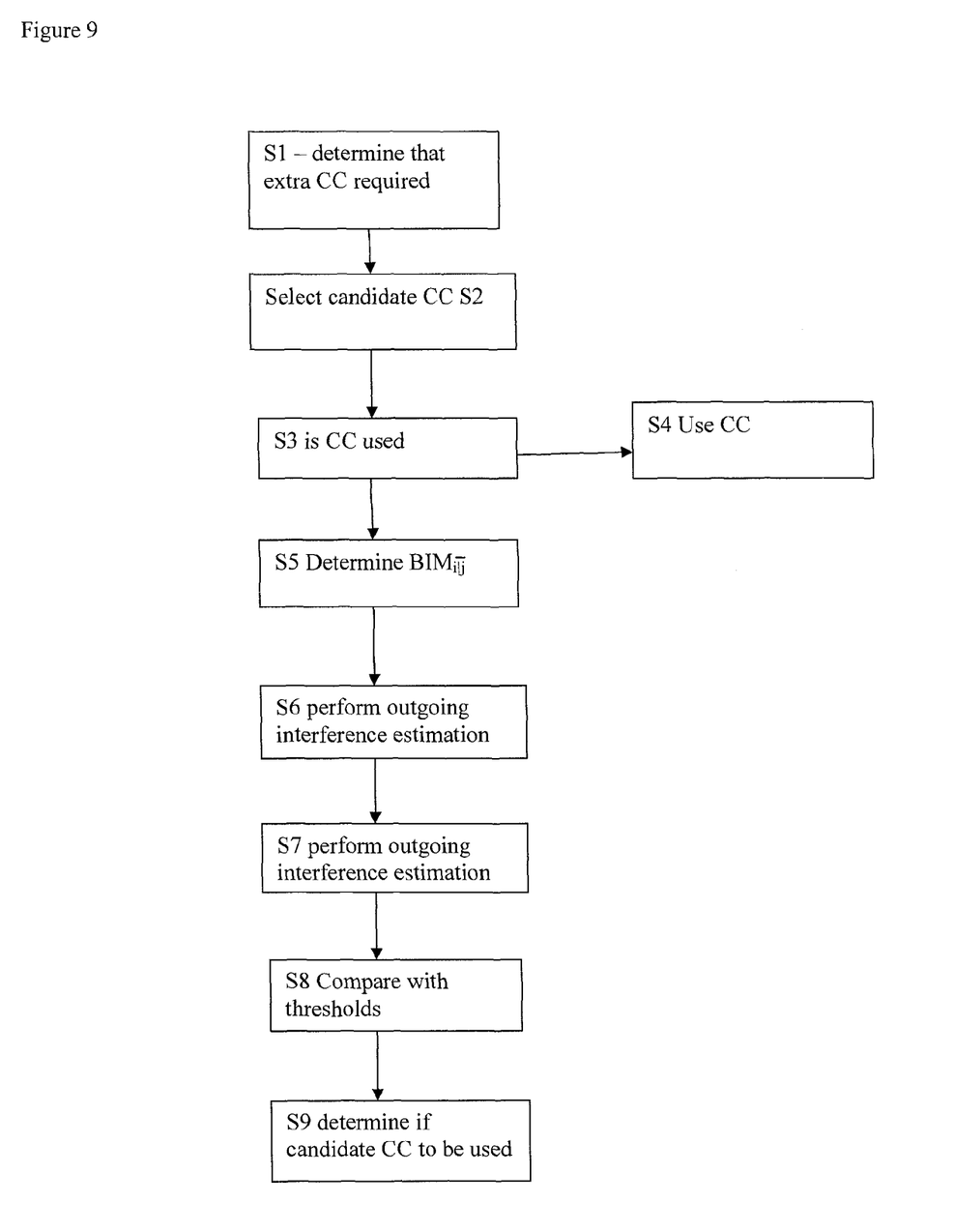
FIG. 9 shows steps of a method which may be performed by an apparatus in accordance with an embodiment.

Given the first-come, first-served nature of some embodiments and the good neighbor/reciprocal altruism policy allocation of a CC may be prohibited if there is a strong outgoing coupling from A to B Reference is now made to FIG. 9 which shows a method of an embodiment. This method is in one embodiment performed for one cell and may be performed in the node of that cell. It may be performed by the control apparatus of FIG. 3.

In step S1, the node determines that an additional (or a first) CC is required.

In step S2, a candidate CC is selected.

In step S3, a determination is made as to whether the CC is used by any of the neighbouring cells. This is determined from the CCRAT table which is stored in at least one memory of the node.

If it is determined in step S3 that the CC is not used by any neighbouring cell, then the next step is step S4 and the candidate CC is finally selected.

If it is determined in step S3 that the CC is used by any neighbouring cell, then the next step is step S5 and the $BIM_{ij}$. is determined. Thus the expected SINR at the cell currently using the CC if the selecting cell does not select that CC is calculated.

In step S6 the outgoing C/I is estimated. This is the C/I which will be caused to the cell currently using the CC if the selecting cell does select that CC. This is calculated as explained above with reference to FIG. 7.

In step S7 the incoming interference is estimated. This is the interference which will be caused by the cell currently using the CC to the selecting cell if the selecting cell does select that CC. This is calculated as explained above with reference to FIG. 8. This step may be omitted in some embodiments.

In step S8, the results of the estimation in steps S6 and S7 may be compared to respective threshold. If the respective values above the respective thresholds, then the next step is step S9 and the selected CC is used.

In some embodiments, there may be an additionally step to determine if there is any limitation on the extent of usage of the CC by the cell and if so what that limitation of that usage is. This is as described previously.

It should be appreciated that in alternative embodiments, the steps may take place in a different order to that shown in FIG. 9. For example steps S6 and S7 can take place in either order or at the same time.

Thus some embodiments use information on potential interference coupling (spatial domain), such as that found in the BIMs used by ACCS with near-real time resource utilization knowledge (temporal domain). Some embodiments may exploit the dynamics of incoming traffic at the network nodes in order to achieve benefits in terms of spectral efficiency and to strike a balance between the minimization of outgoing interference and the usefulness of a given CC.

It is noted that whilst embodiments have been described in relation to LTE-Advanced, similar principles can be applied to any other communication system. Also, instead of carriers provided by a base station a carrier comprising component carriers may be provided by a communication device such as a mobile user equipment. For example, this may be the case in application where no fixed equipment provided but a communication system is provided by means of a plurality of user equipment, for example in adhoc networks. Therefore, although certain embodiments were described above by way of example with reference to certain exemplifying architectures for wireless networks, technologies and standards, embodiments may be applied to any other suitable forms of communication systems than those illustrated and described herein. In some other embodiments the aforementioned embodiments can be adopted to other orthogonal frequency division multiple access (OFDMA) frequency division duplex (FDD) based communication system other than LTE.

It is also noted herein that while the above describes exemplifying embodiments of the invention, there are several variations and modifications which may be made to the disclosed solution without departing from the scope of the present invention.

The required data processing apparatus and functions of a base station apparatus, a communication device and any other appropriate station may be provided by means of one or more data processors. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Some embodiments may be implemented by computer software executable by a data processor of the communication device, such as in the processor entity, or by hardware, or by a combination of software and hardware.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more of any of the other embodiments previously discussed.

The invention claimed is:

1. A method comprising:
   selecting a candidate component carrier for a cell; and
   determining that said candidate component carrier is to be used in said cell in dependence on spatial information and information indicating activity in at least one of said cell and another cell using said candidate component carrier, wherein said activity comprises an average resource utilization due to temporal traffic variability.

2. The method as claimed in claim 1, comprising determining that said candidate component carrier is to be used in said cell in dependence on information on interference coupling between said cell and said another cell.

3. The method as claimed in claim 2, wherein said interference coupling information comprises at least one of incoming carrier to interference information and outgoing carrier to interference information.

4. The method as claimed in claim 2, wherein said interference coupling information comprises background interference matrix information.

5. The method as claimed in claim 2, wherein said interference coupling information comprises measured value information for said candidate component carrier.

6. The method as claimed in claim 1, wherein said activity information comprises expected signal to noise ratio at said another cell when said candidate cell does not use said candidate component carrier.

7. The method as claimed in claim 1, wherein said activity information comprises predefined signal to noise ratio information of a free component carrier.

8. The method as claimed in claim 1, wherein said information indicating activity comprises information indicating usage of at least one of frequency and time resources by said cell.

9. The method as claimed in claim 1, wherein said information indicating expected activity is in respect of said candidate component carrier.

10. The method as claimed in claim 1, wherein said average resource utilization information is for a plurality of component carriers.

11. The method as claimed in claim 10, wherein said information indicating expected activity comprises physical resource block usage information.

12. The method as claimed in claim 1, wherein said activity information comprises a probability of said cell transmitting on said candidate component carrier given that said another cell transmits at a same time on said candidate component carrier.

13. The method as claimed in claim 1, wherein said determining comprises determining at least one of incoming and outgoing interference to said another cell.

14. The method as claimed in claim 13, wherein said determining comprises comparing said interference to a threshold.

15. The method as claimed in claim 14, wherein said threshold is dependent on if said candidate component carrier is a base component carrier or a secondary component carrier in said another cell.

16. The method as claimed in claim 13, comprising defining a level of activity for said candidate component carrier in said cell such that a requirement associated with said threshold is met.

17. A non-transitory memory storing a computer program, the computer program comprising executable code executed by at least one processor to perform the steps according to claim 1.

18. An apparatus comprising
at least one processor and
at least one memory including computer program code, the at least one memory and computer program code configured, with the at least one processor, to cause the apparatus to:
select a candidate component carrier for a cell; and
determine that said candidate component carrier is to be used in said cell in dependence on spatial information and information indicating activity in at least one of said cell and another cell using said candidate component carrier, wherein said activity comprises an average resource utilization due to temporal traffic variability.

19. The apparatus as claimed in claim 18, wherein the at least one memory and computer program code is configured, with the at least one processor, to cause the apparatus to determine that said candidate component carrier is to be used in said cell in dependence on information on interference coupling between said cell and said another cell.

20. The apparatus as claimed in claim 19, wherein said interference coupling information comprises at least one of incoming carrier to interference information and outgoing carrier to interference information.

21. The apparatus as claimed in claim 19, wherein said interference coupling information comprises background interference matrix information.

22. The apparatus as claimed in claim 19, wherein said interference coupling information comprises measured value information for said candidate component carrier.

23. The apparatus as claimed in claim 18, wherein said activity information comprises expected signal to noise ratio at said another cell when said candidate cell does not use said candidate component carrier.

24. The apparatus as claimed in claim 18, wherein said activity information comprises predefined signal to noise ratio information of a free component carrier.

25. The apparatus as claimed in claim 18, wherein said activity information activity comprises information indicating usage of at least one of frequency and time resources by said cell.

26. The apparatus as claimed in claim 18, wherein said information indicating expected activity is in respect of said candidate component carrier.

27. The apparatus as claimed in claim 18, wherein said average resource utilization information is for a plurality of component carriers.

28. The apparatus as claimed in claim 18, wherein said information indicating expected activity comprises physical resource block usage information.

29. The apparatus as claimed in claim 18, wherein said activity information comprises a probability of said cell transmitting on said candidate component carrier given that said another cell transmits at a same time on said candidate component carrier.

30. The apparatus as claimed in claim 18, wherein the at least one memory and computer program code is configured to with the at least one processor cause the apparatus to determine at least one of incoming and outgoing interference to said another cell.

31. The apparatus as claimed in claim 30, wherein the at least one memory and computer program code is configured to with the at least one processor cause the apparatus to compare said interference to a threshold.

32. The apparatus as claimed in claim 31, wherein said threshold is dependent on if said candidate component carrier is a base component carrier or a secondary component carrier in said another cell.

33. The apparatus as claimed in claim 31, wherein the at least one memory and computer program code is configured to with the at least one processor cause the apparatus to define a level of activity for said candidate component carrier in said cell such that a requirement associated with said threshold is met.

34. A base station comprising apparatus as claimed in claim 18.

* * * * *